United States Patent
Stamps et al.

(10) Patent No.: US 7,845,909 B2
(45) Date of Patent: *Dec. 7, 2010

(54) ASSEMBLY FOR PROVIDING FLEXURE TO BLADE SYSTEM

(75) Inventors: Frank B. Stamps, Colleyville, TX (US); Patrick R. Tisdale, Roanoke, TX (US); Paul Sherrill, Grapevine, TX (US); Richard Rauber, Arlington, TX (US); Thomas C. Campbell, Keller, TX (US); James Lee Braswell, Jr., Colleyville, TX (US); Ron Measom, Hurst, TX (US); Tricia Hiros, Hurst, TX (US); David Popelka, Colleyville, TX (US); Michael J. Southerland, Richland Hills, TX (US); Keith Stanney, Dallas, TX (US); Mark Wasikowski, Keller, TX (US); Tim Ledbetter, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 737 days.

This patent is subject to a terminal disclaimer.

(21) Appl. No.: 11/794,850

(22) PCT Filed: Jan. 24, 2006

(86) PCT No.: PCT/US2006/002284

§ 371 (c)(1),
(2), (4) Date: Jul. 6, 2007

(87) PCT Pub. No.: WO2006/081181

PCT Pub. Date: Aug. 3, 2006

(65) Prior Publication Data

US 2008/0101934 A1     May 1, 2008

Related U.S. Application Data

(63) Continuation-in-part of application No. 11/040,173, filed on Jan. 24, 2005, now Pat. No. 7,665,969.

(51) Int. Cl.
*B63H 1/06* (2006.01)

(52) U.S. Cl. .................. 416/134 A; 416/135; 416/140; 416/141

(58) Field of Classification Search ............. 416/134 R, 416/134 A, 135 R, 135 A, 140 A, 141, 135
See application file for complete search history.

(56) References Cited

U.S. PATENT DOCUMENTS 3,669,566 A     6/1972  Bourquardez et al.

(Continued)

OTHER PUBLICATIONS

Chinese Office Action from Application No. 200680002997.8.
Amendment dated Sep. 2, 2008 from Application No. 200680002997.8.

(Continued)

*Primary Examiner*—Hoang M Nguyen
(74) *Attorney, Agent, or Firm*—James E. Walton; Richard G. Eldredge

(57) ABSTRACT

An assembly for providing flexure to a blade of a rotary blade system includes an upper support plate having an upper curved surface, a lower support plate having a lower curved surface, and a yoke positioned therebetween. At least one of the upper and lower yoke surfaces has a layer of cushioning material positioned thereon and secured thereto. An alternate embodiment includes an assembly for providing flexure to a blade of a rotary blade system, including, an upper support plate having an upper curved surface, a lower support plate having a lower curved surface, and a yoke positioned therebetween and directly contacting the support plates wherein one of the curved surfaces is a non-circular arc that does not form part of the circumference of a circle. Another alternate embodiment includes a similar assembly having a twist-shank type of yoke for providing rotation of attached blades about their respective pitch axes.

40 Claims, 15 Drawing Sheets

U.S. PATENT DOCUMENTS

| | | | |
|---|---|---|---|
| 3,999,887 A | 12/1976 | McGuire | |
| 4,008,980 A | 2/1977 | Nochren et al. | |
| 4,021,141 A | 5/1977 | Watson | |
| 4,047,839 A | 9/1977 | Ferris et al. | |
| 4,093,400 A | 6/1978 | Rybicki | |
| 4,182,597 A | 1/1980 | Derschmidt | |
| 4,201,515 A | 5/1980 | Derschmidt et al. | |
| 4,203,709 A | 5/1980 | Watson | |
| 4,222,709 A | 9/1980 | Mouille | |
| 4,227,857 A | 10/1980 | Reyes | |
| 4,227,859 A | 10/1980 | Gouzien et al. | |
| 4,273,511 A | 6/1981 | Mouille et al. | |
| 4,297,080 A | 10/1981 | Krauss et al. | |
| 4,306,837 A | 12/1981 | Brogdon et al. | |
| 4,332,525 A | 6/1982 | Cheney, Jr. | |
| 4,344,739 A | 8/1982 | Derschmidt et al. | |
| 4,352,631 A | 10/1982 | Buchs et al. | |
| 4,369,018 A | 1/1983 | Brunsch et al. | |
| 4,427,340 A | 1/1984 | Metzger et al. | |
| 4,430,045 A | 2/1984 | Cresap | |
| 4,455,123 A | 6/1984 | Sanders et al. | |
| 4,564,336 A | 1/1986 | Sampatacos | |
| 4,650,401 A | 3/1987 | Yao et al. | |
| 4,676,720 A | 6/1987 | Niwa et al. | |
| 5,059,094 A * | 10/1991 | Robinson et al. | 416/134 A |
| 5,110,259 A | 5/1992 | Robinson | |
| 5,211,538 A | 5/1993 | Seghal et al. | |
| 5,358,381 A | 10/1994 | Covington et al. | |
| 5,820,344 A | 10/1998 | Hamilton et al. | |
| 6,375,425 B1 | 4/2002 | Lee et al. | |
| 6,695,106 B2 | 2/2004 | Smith et al. | |
| 6,708,921 B2 | 3/2004 | Sims et al. | |
| 7,665,969 B2 * | 2/2010 | Stamps et al. | 416/134 A |

OTHER PUBLICATIONS

Chinese Notice of Allowance from Application No. 200680002997.8.
Chines Patent No. 101107164A dated Aug. 26, 2009 from Application No. 200680002997.8.
Canadian Office Action dated 20100121 from Application No. 2,592,644.
Int'l Search Report and Written Opinion of ISA in PCT/US2006/002413, Oct. 16, 2006, Bell Helicopter Textron, et al.

* cited by examiner

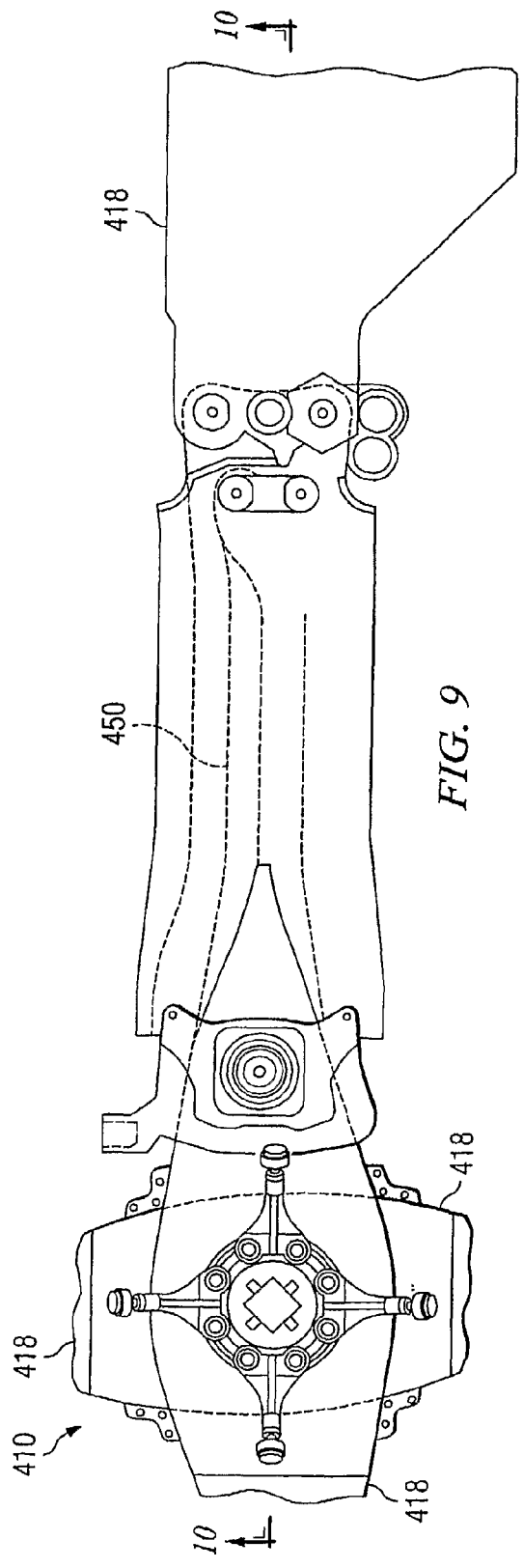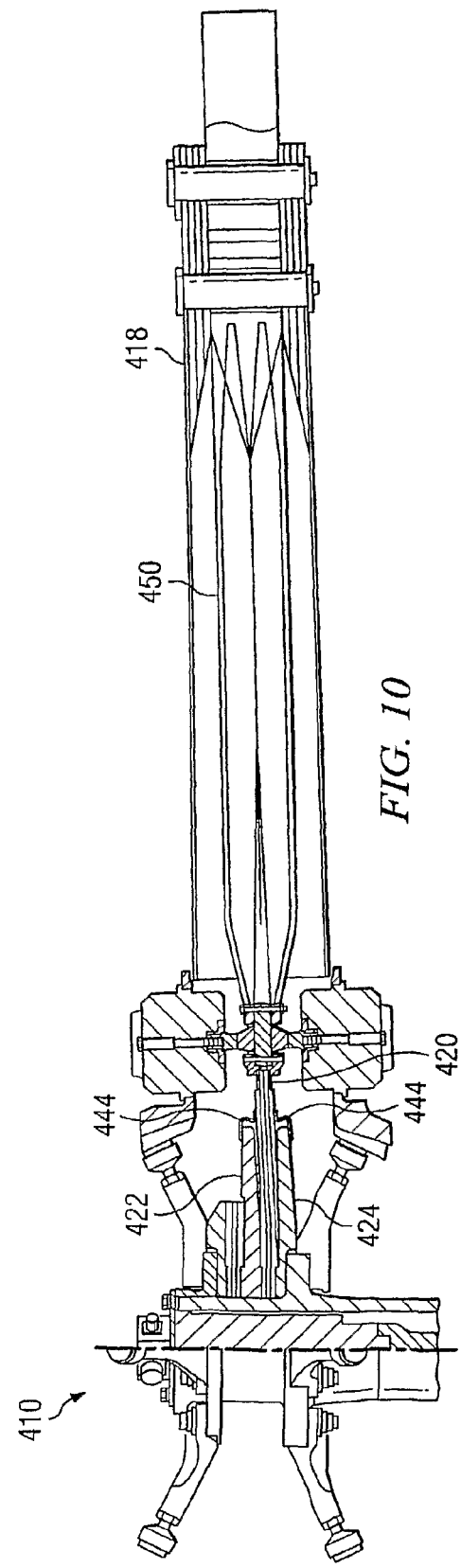

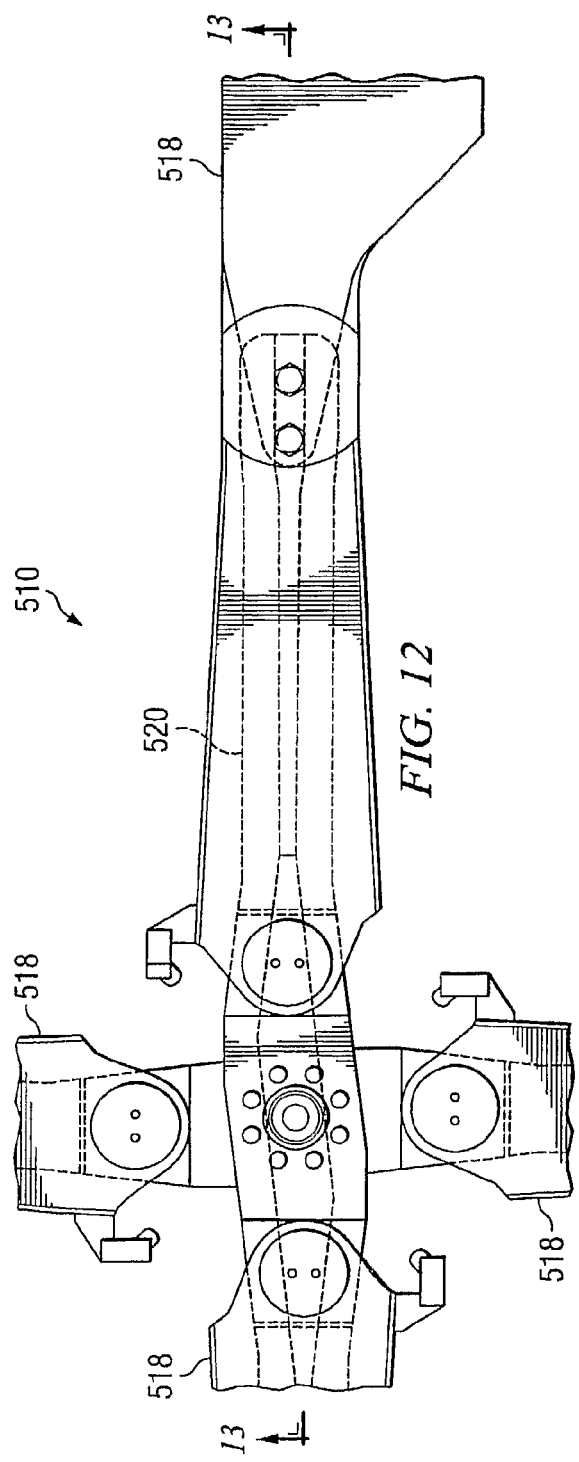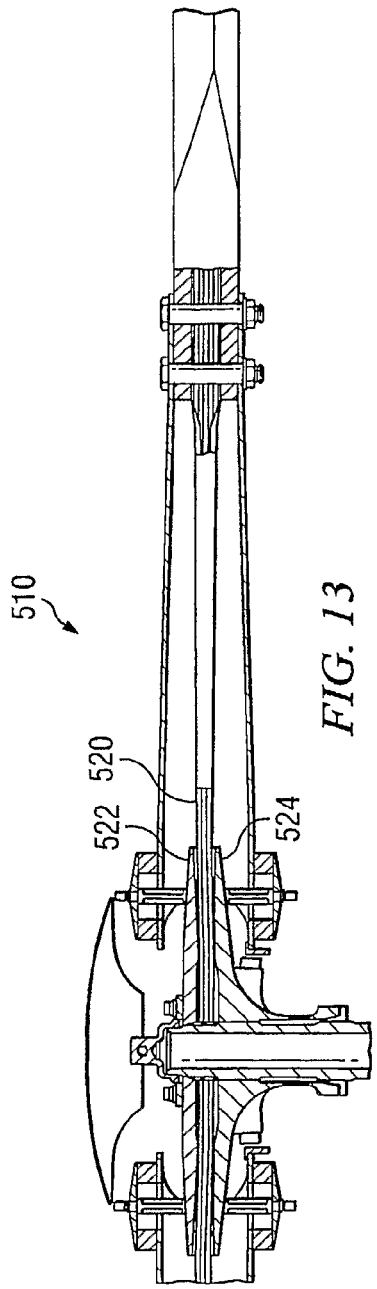

ASSEMBLY FOR PROVIDING FLEXURE TO BLADE SYSTEM

This application is a Continuation-in-Part of U.S. patent application Ser. No. 11/040,173, filed 24 Jan. 2005 now U.S. Pat. No. 7,665,969.

FIELD OF THE INVENTION

The present invention relates to improvements for a rotor of a vehicle. More specifically, the present invention relates to improvements relating to providing for the flapping of rotor blades used in aircraft.

SUMMARY OF THE INVENTION

One aspect of the invention relates to an assembly for providing flexure to a blade of a rotary blade system, comprising an upper support plate having an upper curved surface; a lower support plate having a lower curved surface; and a yoke positioned between said upper support plate and said lower support plate, said yoke having an upper yoke surface and a lower yoke surface, one yoke surface of said upper and lower yoke surfaces having a layer of cushioning material positioned on and secured to said one yoke surface, said layer of cushioning material extending along and following the general contour of said one yoke surface, and said layer of cushioning material directly contacting one of said upper curved surface of said upper support plate and said lower curved surface of said lower support plate.

Another aspect of the invention relates to an assembly for providing flexure to a blade of a rotary blade system, comprising an upper support plate having an upper curved surface; a lower support plate having a lower curved surface; and a yoke positioned between and directly contacting said upper support plate and said lower support plate, wherein one of said upper curved surface and said lower curved surface is a non-circular arc that does not form part of the circumference of a circle.

Another aspect of the invention relates to an assembly for providing flexure to a blade of a rotary blade system, comprising an upper support plate having an upper curved surface; a lower support plate having a lower curved surface; and a yoke positioned between and directly contacting said upper support plate and said lower support plate, wherein the yoke is twist-shank yoke providing for rotation of the blade about a corresponding pitch axis.

Another aspect of the invention relates to an assembly comprising a four-bladed, stiff-in-plane hub, which may be used as a tiltrotor hub. The hub incorporates the supported flexure design of other embodiments herein. Additionally, alternative embodiments are shown that incorporate deformable support plates.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

For a more complete understanding of the present invention, including its features and advantages, reference is now made to the detailed description of the invention taken in conjunction with the accompanying drawings, in which:

FIG. 9 is a top view of a rotor system in accordance with another embodiment of the invention employing curved yoke support plates in accordance with an embodiment of the invention;

FIG. 10 is a side, elevational, partial cross-sectional view taken along line 10-10 in FIG. 9;

FIG. 12 is a top view of a rotor system in accordance with another embodiment of the invention employing curved yoke support plates in accordance with an embodiment of the invention;

FIG. 13 is a side, elevational, cross-sectional view taken along line 13-13 in FIG. 12;

DESCRIPTION OF THE PREFERRED EMBODIMENT

Figure 1:
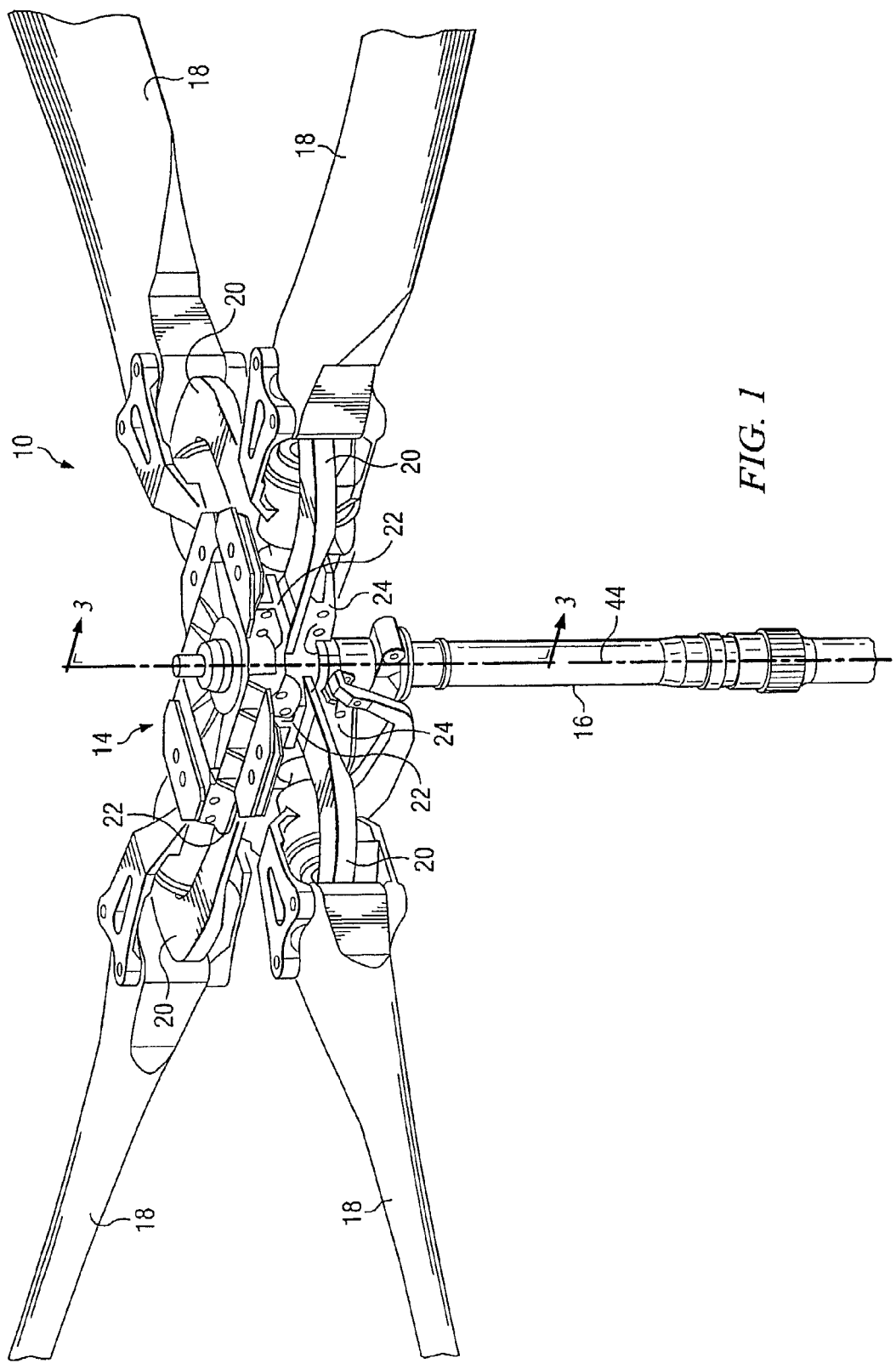
FIG. 1 is a perspective view illustrating a main rotor system of a helicopter in accordance with an embodiment of the invention.

FIG. 1 illustrates a main rotor system 10 for a helicopter including an embodiment of the flexure assembly in accordance with the subject application. Main rotor system includes a hub 14 mounted on a main rotor shaft 16 and a plurality of main rotor blades 18 coupled to and extending from the hub 14.

Main rotor systems are generally known in the art as disclosed in U.S. Pat. Nos. 4,650,401 to Yao et al., 5,358,381 to Covington et al.; 5,820,344 to Hamilton et al.; and 6,708,921 to Sims et al., each of which is incorporated herein in its entirety by reference thereto, respectively.

During flight, as the helicopter gains air speed, the increased air speed and lift on the advancing rotor blade 18 causes the advancing rotor blade 18 to flap up while the decreased lift on the retreating rotor blade 18 causes the retreating rotor blade 18 to flap down. The flapping of each blade 18 is accommodated by a flexible yoke 20 that is coupled between the hub 14 and each blade 18. Yoke 20 is relatively stiff in the chordwise direction but flexible in the flapping direction. In order to control the flapping of each blade 18, the yoke coupled between each blade 18 and hub 14 is supported by a curved, upper yoke support plate 22 and a curved, lower yoke support plate 24.

FIGS. 1-4 illustrate one embodiment of a main rotor system and, further, one embodiment of a hub 14, yoke 20, and blade 18 configuration. It should be understood that various embodiments may be employed and that FIGS. 1-4 and the other embodiments illustrated in this application only provide illustrated embodiments of a few of the embodiments of the invention.

Figure 2:
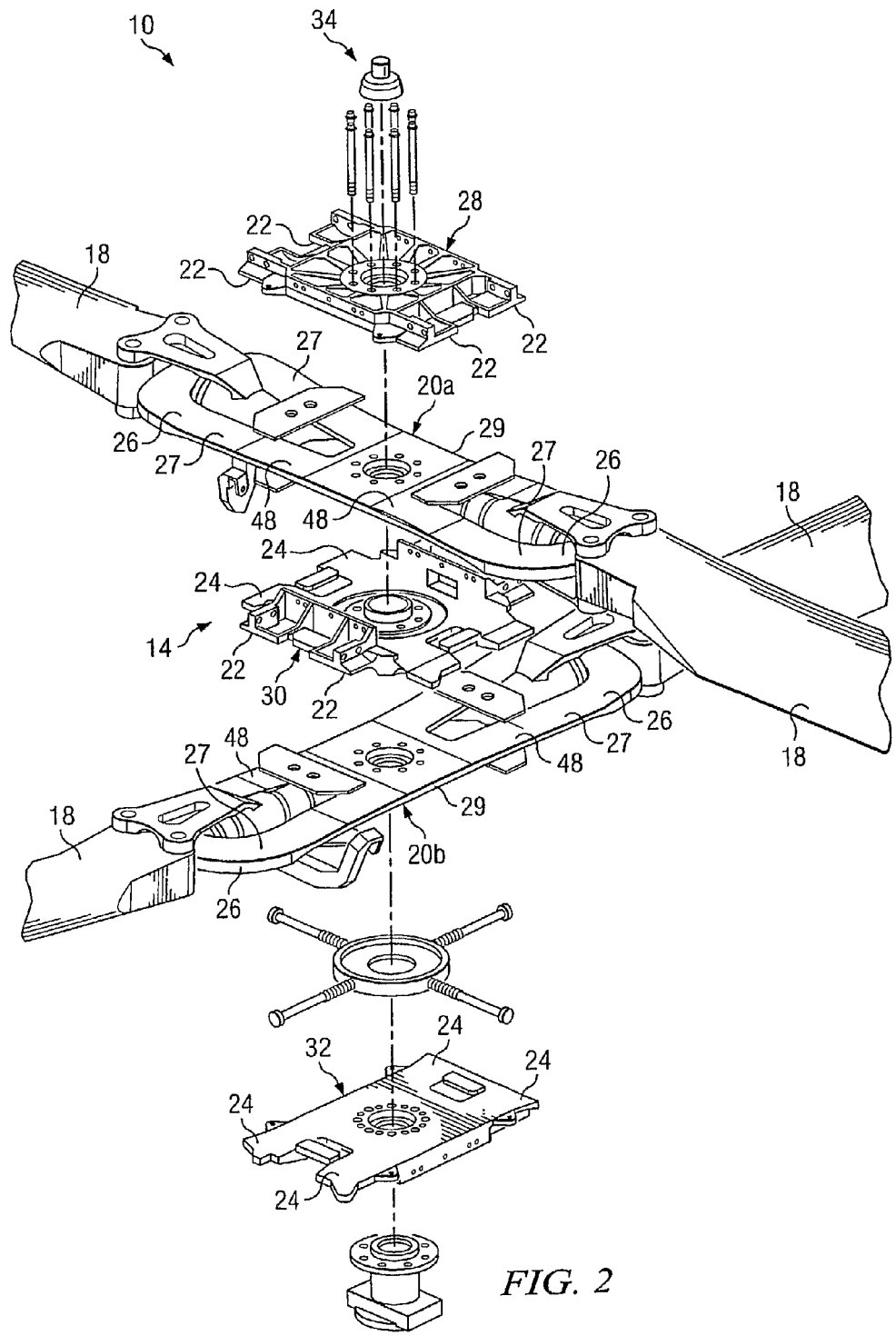
FIG. 2 is an exploded view of FIG. 1.

As seen in FIGS. 1 and 2, the yoke 20 of FIGS. 1 and 2 is an elongated yoke 20 configured with two loops 26, with one loop 26 for each blade 18. Each loop 26 forms a pair of arms 27 extending from the middle section 29 of the yoke 20. The illustrated yoke 20a is configured for use with two opposing blades 18 and with the use of a second, lower yoke 20b positioned beneath the first, upper yoke 20a. The second, lower yoke 20b being attached to each of the remaining two blades 18 of the rotor assembly 10. The yokes 20 may be made from various materials, including composite materials such as fiberglass.

The main rotor shaft 16 connects to and provides rotation to the hub 14 as generally known. The hub includes a pairs of support plates 22 and 24 for each blade 18. The upper support plates 22 for the upper yoke 20a are provided on a top bracket 28, the lower support plates 24 for the upper yoke 20a and the upper support plates 22 for the lower yoke 20b are provided on a middle bracket 30, and the lower support plates 24 for the lower yoke 20b are provided on a bottom bracket 32. As mentioned above, each of the upper support plates 22 and each of the lower support plates 24 are curved as explained below. The upper yoke 20a is sandwiched between brackets 28 and 30 while lower yoke is sandwiched between brackets 30 and 32. The yokes 20a and 20b the brackets 28, 30, and 32 are secured together by appropriate fastening mechanisms, including mechanisms such as fasteners 34 such that the brackets 28, 30, and 32 clamp and support the yokes 20. The brackets 28, 30, and 32 and the support plates 22 and 24 may be made from a variety of materials, including metal. As evident from the drawings, once assembled, there is an upper support plate 22 and a lower support plate 24 for each arm 27 of each yoke 20.

To avoid redundancy, the discussion herein will focus on the connection between only one of the blades 18 and the hub 14 and the use of a single loop 26 of the yoke 20 since the connection between each of the blades 18 and the hub 14 and the respective use of the yoke 20 is substantially identical for the connection between each blade 18 and the hub 14.

Figure 3:
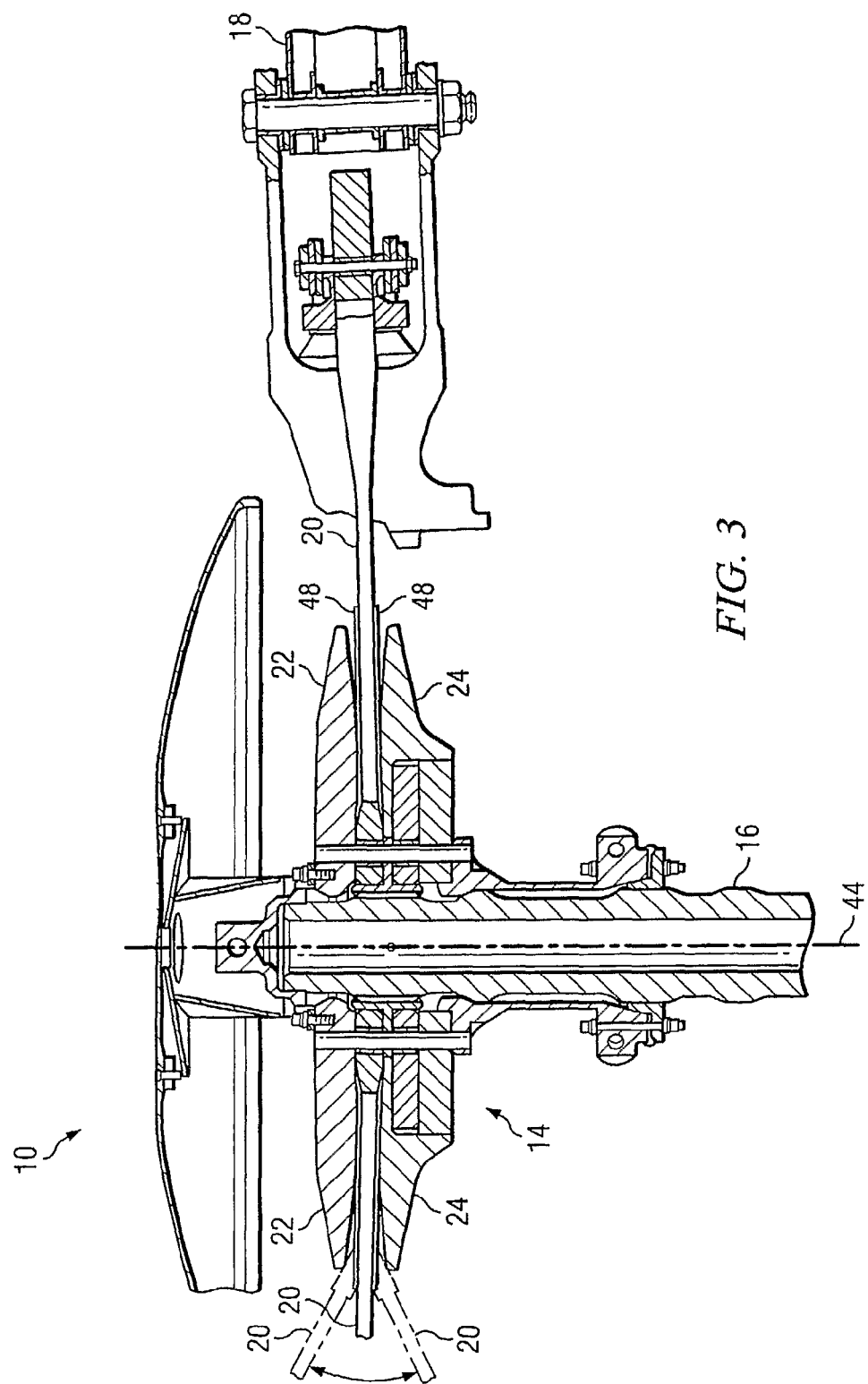
FIG. 3 is a cross-sectional, side elevational view taken along line 3-3 of FIG. 1.
Figure 4:
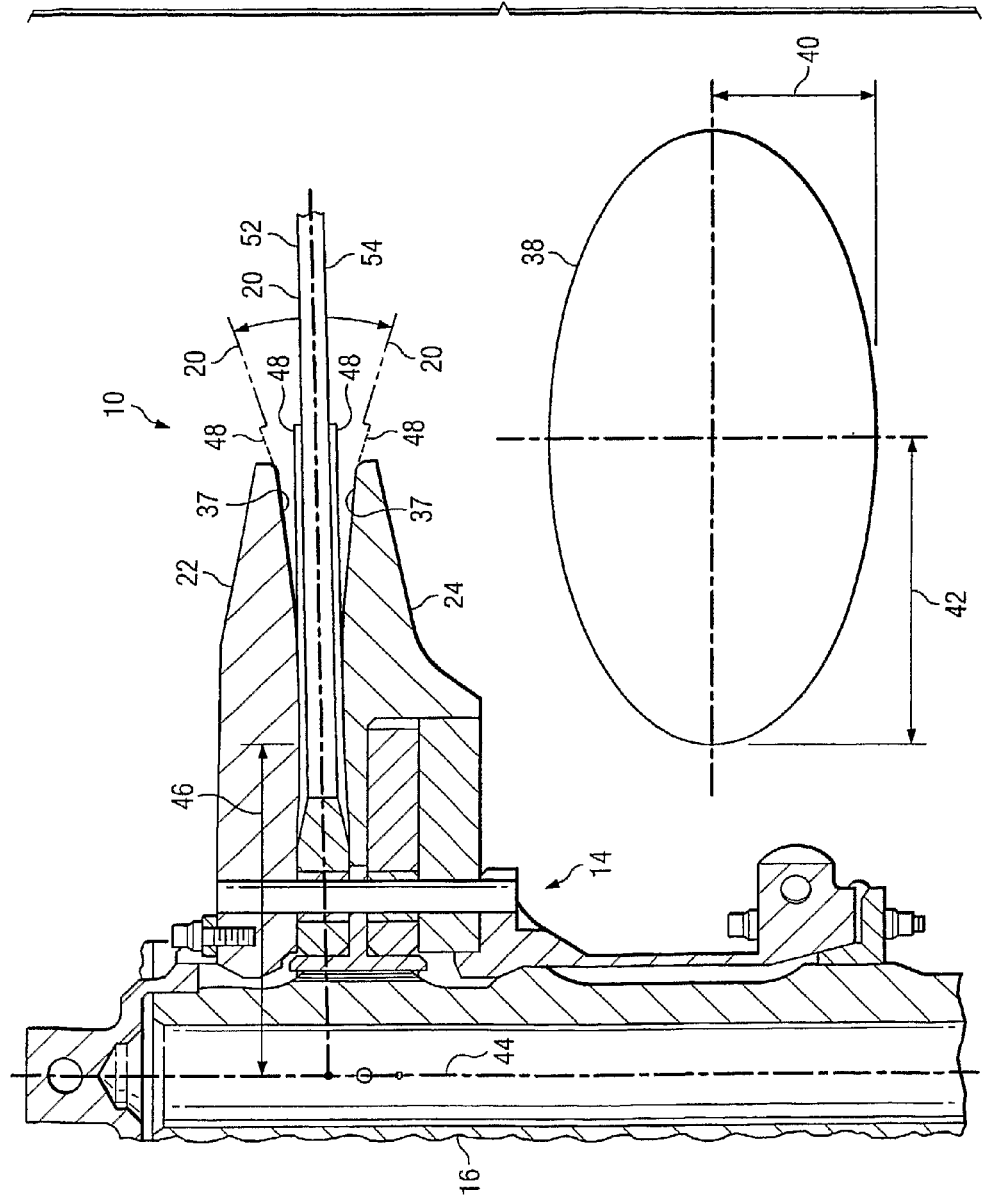
FIG. 4 is an enlarged view of FIG. 3 and additionally illustrating an example of the elliptical configuration of the yoke support plate surfaces.

As best seen in FIGS. 3 and 4, the upper and lower support plates 22 and 24 are curved to provide the desired flapping characteristics to the respective yoke 20 and to the respective blade 18. Thus, the blade 18 may flap up and down and abut the upper and lower plates as shown in dashed lines in FIGS. 3 and 4. As illustrated, each of upper and lower support plates 22 and 24 are curved to form a non-circular arc that does not form part of the circumference of a circle. Other embodiments, however, may include support plates 22 and 24 that are curved arcs of a circle. Also, although each of upper and lower support plates 22 and 24 are illustrated as having substantially identical curvatures, it should be understood that upper and lower plates 22 and 24 may have different curvatures than one another and, further, that other embodiments may include only one of the plates 22 and 22 being curved.

As illustrated in FIGS. 3 and 4, the curvature of the upper and lower plates 22 and 24 is elliptical to form an elliptical surface 37. That is, the shape of each of the upper and lower plates forms an arc or portion of an ellipse. For reference, FIG. 4 illustrates the ellipse 38 that corresponds to the curvature of the upper and lower plates 32 and 34 as shown in FIG. 4. The elliptical curvature provides enhanced control of the flapping of the blades 18. Although various curvatures are possible depending on the desired flapping characteristics of the blades 18, one embodiment employs an elliptical surface corresponding to a 8, 16 radius elliptical surface, for example, the minor axis 40 being approximately 8 inches and the major axis 42 being approximately 16 inches. Of course the location of the upper and lower plates and the position of their respective curvatures relative to the axis about which the hub 14 and shaft 16 rotate may be varied depending on the desired flapping characteristics. This distance 46 from the axis 44 of rotation to the tangent to the ellipse 38 forming the curvature of the upper and lower support plates 22 and 24 may be selected based on desired blade flapping characteristics. One example provides a distance 46 of approximately 5.102 inches.

Figure 5:
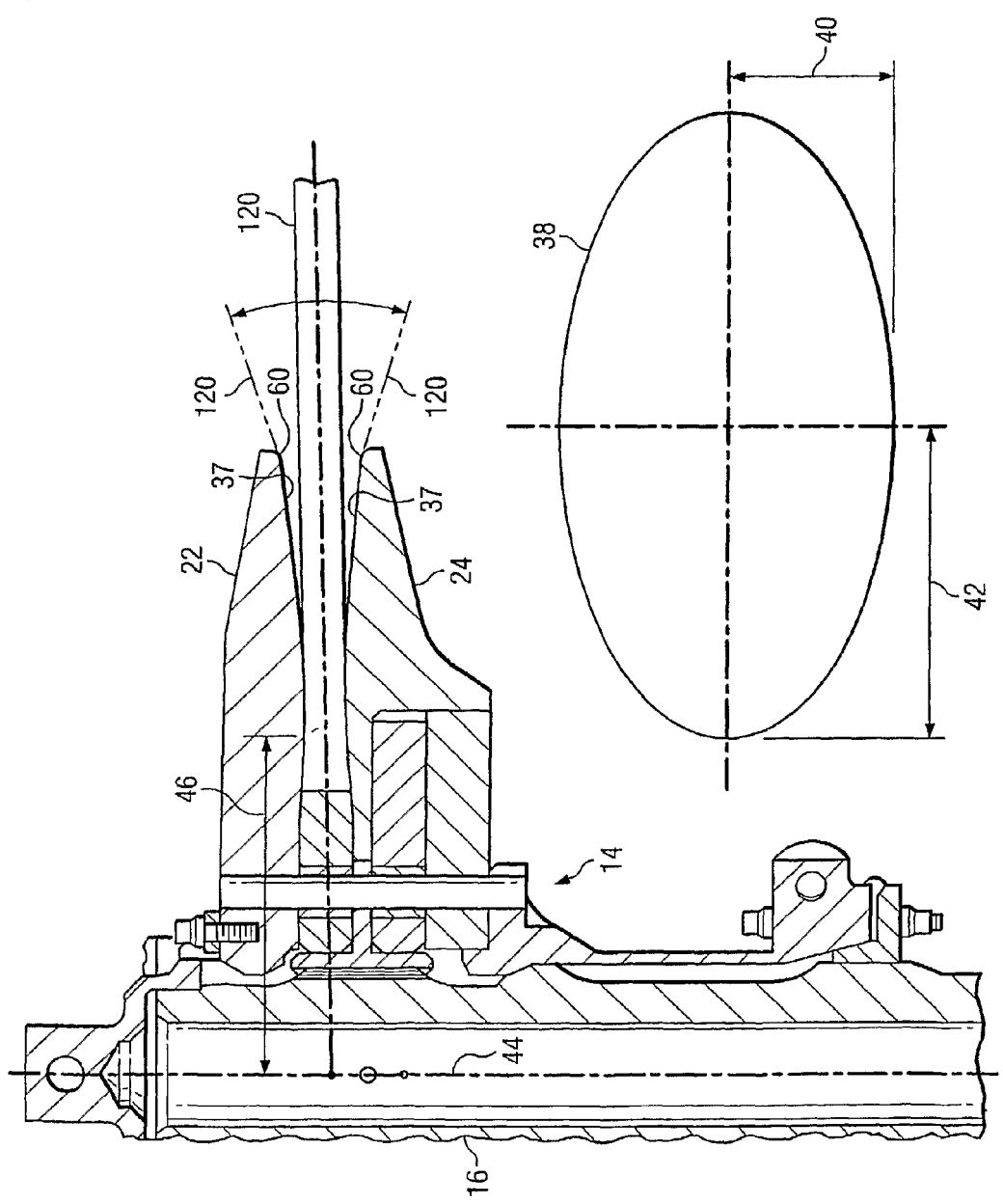
FIG. 5 is similar to FIG. 4 but shows another embodiment of an assembly, without cushioning on the yoke.

Since repeated flapping of a blade 18 against the upper and/or lower support plates 22 and 24 may cause damage to the yoke 20, a cushioning or protective layer 48 may be provided to the yoke 20. Although, FIGS. 1-4 illustrate a cushioning layer 48 on both an upper yoke surface 52 and a lower yoke surface 54, it should be understood that only one of the upper and lower yoke surfaces 52 and 54 may have the cushioning material. Also, as seen in FIG. 5, cushioning material may be omitted entirely and the yoke 120 may be capable of contacting the upper and lower contacting plates with no cushioning material. Otherwise, FIG. 5 is substantially identical to the assembly of FIG. 4.

Figure 6:
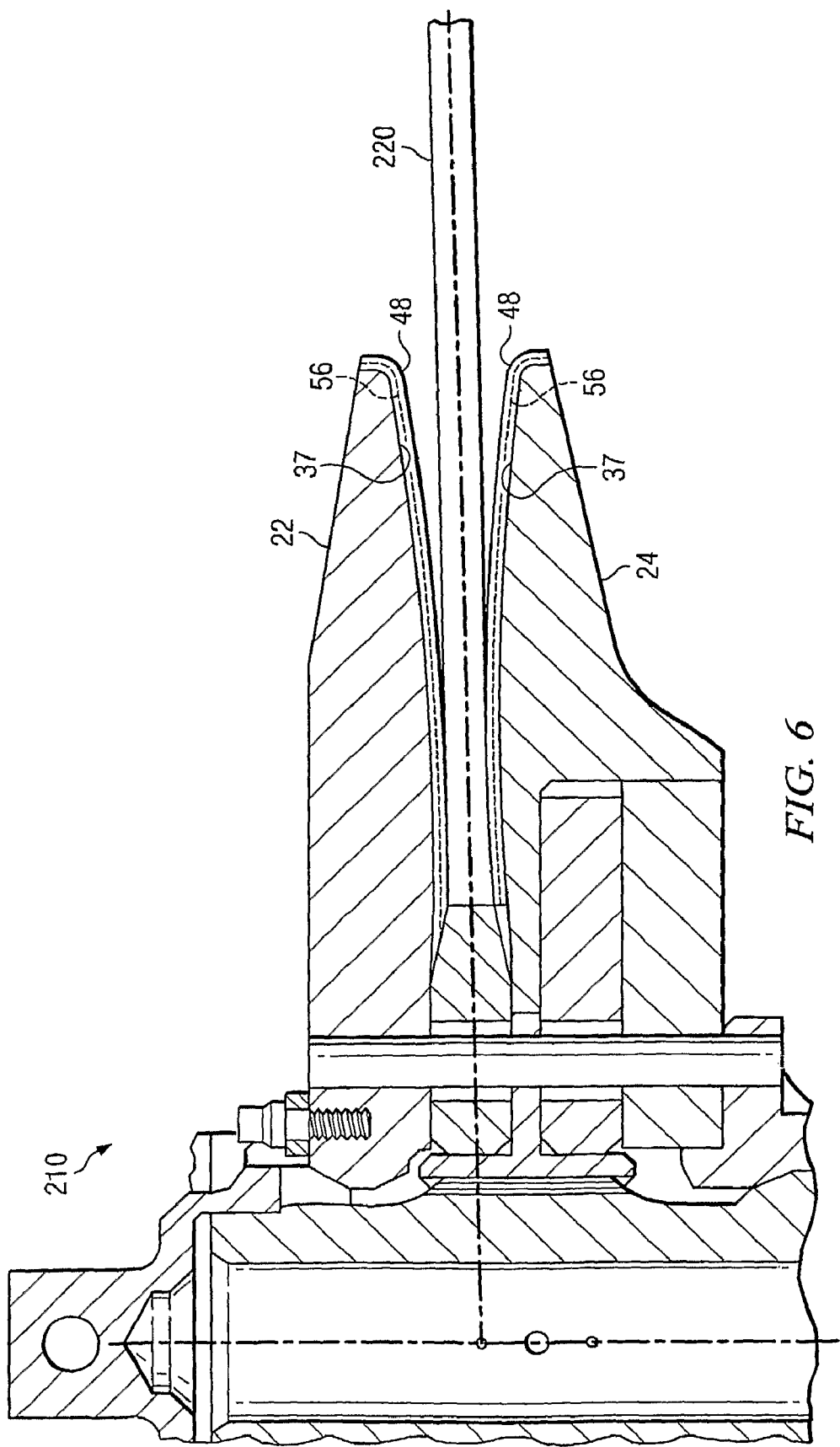
FIG. 6 is an enlarged view similar to FIG. 4 but illustrating another embodiment in accordance with the subject invention illustrating cushioning material on the support plates instead of on the yoke as illustrated in FIG. 4.

Additionally, as seen in FIG. 6, the layer of cushioning material 48 may be placed on the upper and lower support plates 22 and 24. FIG. 6 illustrates a rotor assembly 210 that is substantially identical to rotor assembly 10 except for the positioning of the cushioning material being placed on the support plates 22 and 24 instead of on the yoke 20 as in FIGS. 1-4. Also, although FIG. 6 illustrates cushioning material on both upper and lower support plates 22 and 24, only the upper support plates 22 or, alternatively, only the lower support plates 24 may have cushioning material 48 instead of both upper and lower support plates 22 and 24 for each blade 18 as shown.

The cushioning material 48 may be any appropriate cushioning material, including elastomeric material, rubber, and polymers such as urethane. The density of the cushioning material 48 may also be selected depending on the desired cushioning durability of the cushioning material 48. Additionally, the material 48 may include a reinforcement member 56 to improve durability by, for example a cloth embedded in the cushioning material 48. One example is to provide a fluorocarbon polymer fabric such as Teflon cloth embedded or otherwise adhered to the cushioning material 48, such as rubber, to increase durability. Still further a protective layer 58 may be provided to the exterior surfaces of the cushioning material 48 to increase durability. For example, the protective layer may be sprayed on the cushioning layer 48. One example of a material to be applied to the cushioning material as a protective layer 58 is a fluorocarbon polymer such as Teflon. Additionally, the reinforcing of cushioning layer 48 may occur regardless of whether the layer 48 is applied to either or both sides of the yoke 20 or to either or both sides of the support plates 22 and 24. Also, the thickness of the cushioning material 48 may be as desired to achieve the desired cushioning characteristics. For example, the cushioning material may be, in one embodiment, 0.100 inches thick on each side of the yoke 20, wherein the yoke may have, for example, a thickness of 0.380 inches. Alternatively, the layers 48 may be formed from wear-resistant or controlled-wear rigid materials, such as a metal or similarly rigid material, to provide for sacrificial wear components that may be replaceable.

Further, a protective layer 60 may be provided to the exterior surfaces of one or both of the support plates 22 and 24 for each blade 18 to increase the durability of the plates 22 and 24 as well as the life of any cushioning material 48. For example, the protective layer 60 may be sprayed on one or both support plates 22 and 24. One example of a material to be applied to the support plates as a protective layer 60 is a fluorocarbon polymer such as Teflon. Additionally, the reinforcing of support plates 22 and 24 may occur regardless of whether the cushioning layer 48 is applied to either or both sides of the yoke 20 or to either or both sides of the support plates 22 and 24. Also, the protective layer 60 may be used on plates 22 and 40 when no cushioning material is used as in FIG. 5.

The configurations disclosed herein are beneficial in that they may provide an increase to the rotor flapping without increasing the flexure length by providing beamwise support to the yoke and using a thinner yoke to reduce the stress thereof. This allows flexure-type rotor hubs to accommodate the increased flapping required by stiffer pylon mounting and center of gravity range. The configurations herein reduce the shear stress for a given amount of flapping by making the yoke thinner while reacting beam forces with external features, such as the curvature of the yoke support plates 22 and 24. Existing main rotor flapping flexure-types hubs are typically limited to approximately plus or minus 5 degrees. However, by employing the principles disclosed herein the range of flapping is increased over previous levels, for example to flapping of approximately plus or minus 8-10 degrees.

Figure 7:
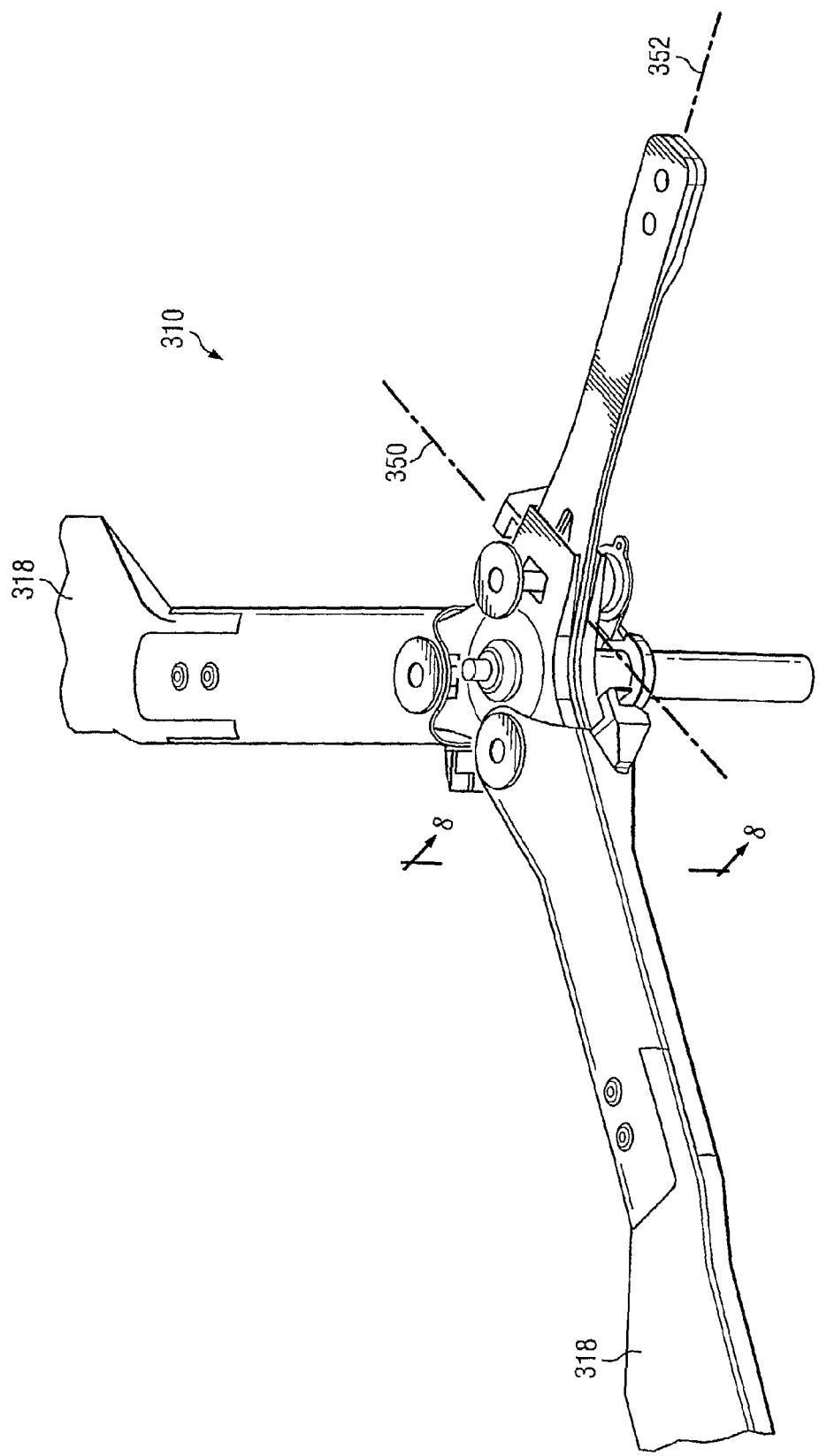
FIG. 7 is a perspective view of a rotor system in accordance with another embodiment of the invention employing curved yoke support plates in accordance with an embodiment of the invention.
Figure 8:
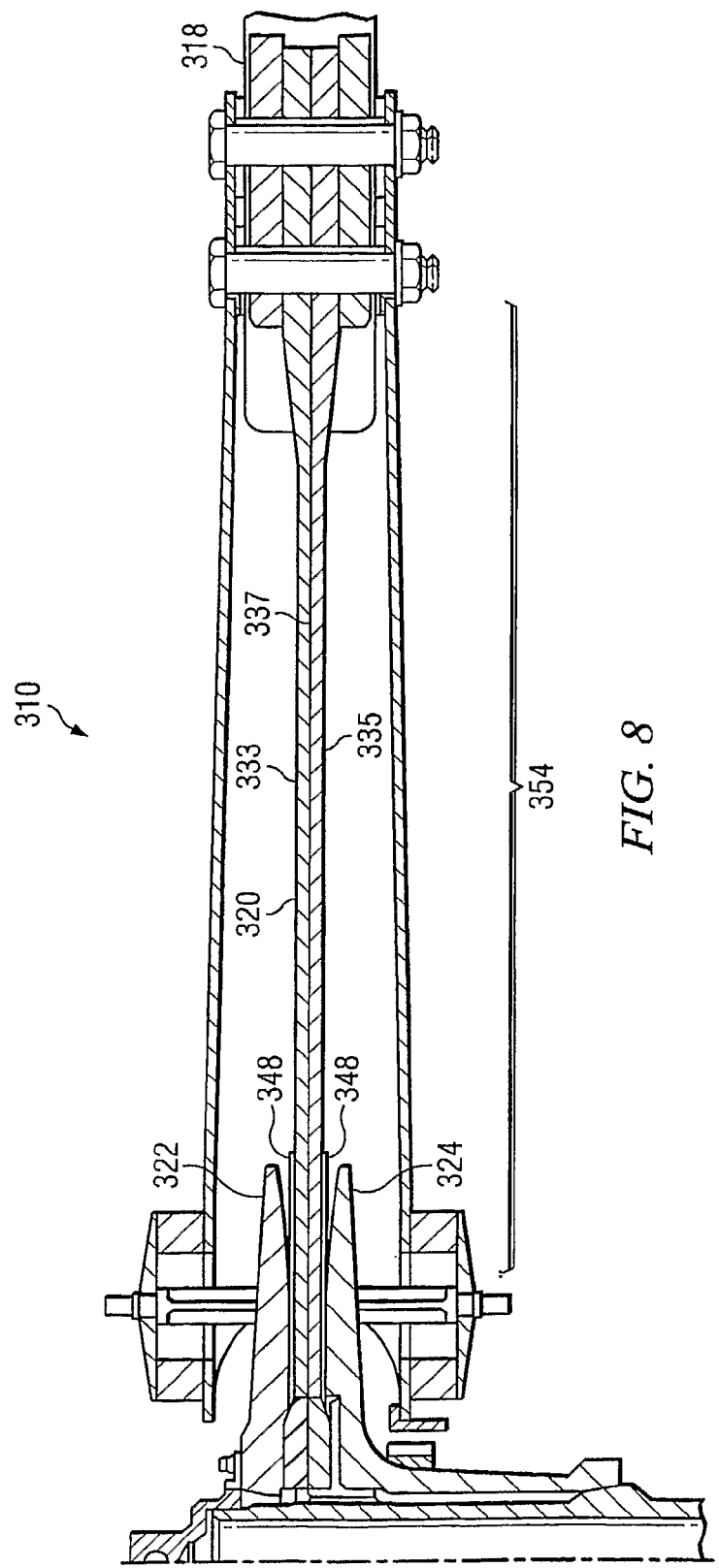
FIG. 8 is a side, elevational cross-sectional view taken along line 8-8 in FIG. 7.

The principles described above are equally applicable on various rotor systems and configurations, For example, FIGS. 7 and 8 illustrate another embodiment of the invention wherein the curved support plates are provided to a twist-shank rotor system 310 having three blades 318. Although configured for three blades instead of four as with FIGS. 1-4 above, the rotor system of 310 is substantially identical in application with the upper and lower support plates 322 and 324, yoke 320, and cushioning material 348 functioning substantially identically as described above with respect to plates 22 and 24, yoke 20, and cushioning material 48, respectively. Additionally, FIG. 8 illustrates a two-piece yoke having an upper yoke layer 333 and a lower yoke layer 335 with an optional buffer or cushioning material 337 positioned therebetween. The buffer material 337 may be substantially identical to cushioning material 48 and may extend for all or only a portion of the length of layers 333, 335. Multi-piece yokes, such as yoke 320, are equally applicable to all embodiments herein, including both twist-shank and loop yokes.

Figure 11:
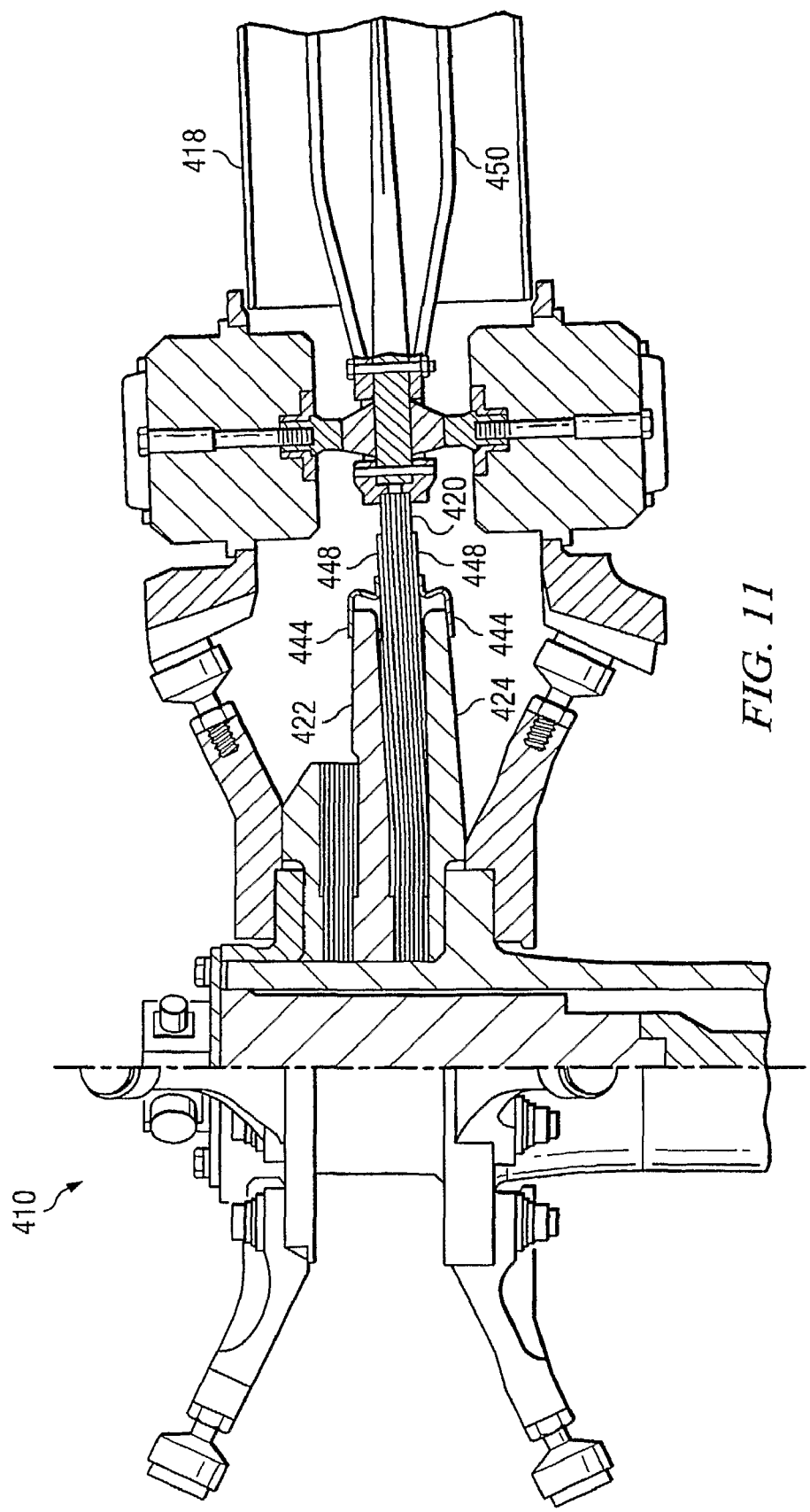
FIG. 11 is an enlarged view of FIG. 10.

As another example, FIGS. 9-11 illustrate another embodiment of the invention wherein the curved support plates are provided to a rotor system 410 having four blades 418, but supported and configured differently from the blades 18 illustrated in FIGS. 1-4. Although configured differently for four blades than with the embodiment of FIGS. 1-4 above, the rotor system of 410 is substantially identical in application with the upper and lower support plates 422 and 424, yoke 420, and cushioning material 448 functioning substantially identically as described above with respect to plates 22 and 24, yoke 20, and cushioning material 48, respectively. Additionally, FIGS. 9-11 illustrate a protective boot 444 to enclose the upper and lower plates 422 and 424 and protect them from debris and foreign particles and is useful in keeping debris and foreign particles out from between the yoke 420 and the support plates 422 and 424. The boot 444 may be made from material such as rubber or elastomer and can be equally applied to any of the various embodiments herein.

Figure 14:
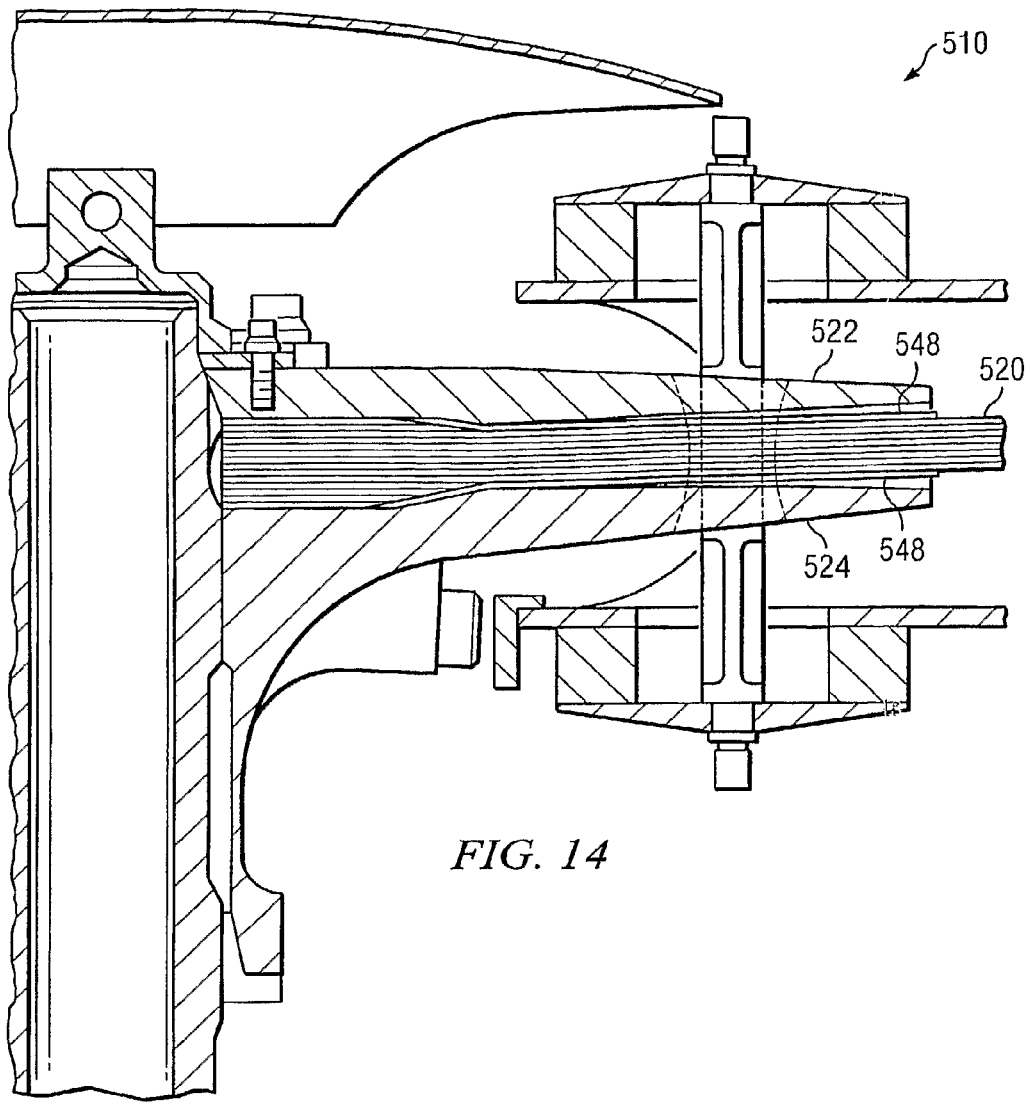
FIG. 14 is an enlarged view of FIG. 13.

As another example, FIGS. 12-14 illustrate yet another embodiment of the invention wherein the curved support plates are provided to a twist-shank rotor system 510 having four blades 518, but supported and configured differently from the blades 18 illustrated in FIGS. 1-4. Although configured differently for four blades than with the embodiment of FIGS. 1-4 above, the rotor system 510 is substantially identical in application with the upper and lower support plates 522 and 524, yoke 520, and cushioning material 548 functioning substantially identically as described above with respect to plates 22 and 24, yoke 20, and cushioning material 48, respectively.

Referring again to FIGS. 7 and 8, rotor system 310 is a twist-shank type of rotor, in which yoke 320 is a multi-piece yoke, as described above. Yoke 320 differs from the yokes shown in the embodiments of FIGS. 1 through 6 in that yoke 320 carries all blades of rotor system 310, rather than two stacked yokes each carrying two blades 318. Yoke 320 allows for flapping of blades 318 about flapping axis 350, but yoke 320 also allows for blades to rotate on a pitch axis 352, providing for pitch changes of blades 318. The outer end of each radial arm, or shank 354, of yoke 320 may be twisted relative to the corresponding inner end about pitch axis 352. Each shank 354 is preferably formed to have a generally rectangular cross-section for a substantial portion of its length, allowing for a smooth transition between the flapping flexure at the inner end and the blade attachment at the outer end.

Likewise, rotor system 410, shown in FIGS. 9 through 11, and rotor system 510, shown in FIGS. 12 through 14, each have a twist-shank yoke. Yoke 520 is constructed in a similar manner to yoke 320, though yoke 520 is configured to carry four blades 518 in a non-stacked arrangement. Yoke 420 is configured to carry four blades in a stacked arrangement, with a finned twist shank 450 allowing for rotation of blades 418 about their pitch axes.

Generally, the thickness of yokes is increased when necessary to support increased centrifugal force loads, such as the increased force due to use of larger blades, and this increased thickness typically decreases the allowable flapping angle for the yoke. The use of a multi-piece yoke, such as yoke 320, in which layers of the yoke are allowed to move relative to each other during flapping allows for a larger flapping angle for the same amount of centrifugal force load capability. Likewise, use of multi-piece yokes configured as torsion-shank yokes allows for a greater amount of torsional twisting per length of yoke arm. While shown as a two-piece design in yoke 320, multi-piece yokes according to the invention may have more layers, each typically being separated from the adjacent layers with a cushioning layer. Additionally or alternatively, materials providing lubrication or other desirable characteristics may be placed between adjacent layers, such as layers of Teflon® or other appropriate materials.

Figure 15:
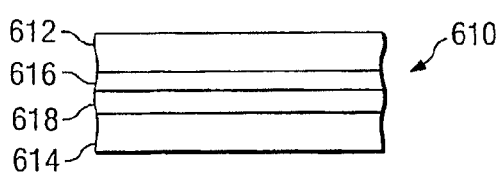
FIG. 15 is an enlarged side view of a portion of a yoke according to the present invention.
Figure 16:
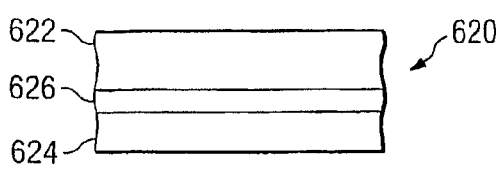
FIG. 16 is an enlarged side view of an alternative embodiment of a yoke according to the invention.
Figure 17:
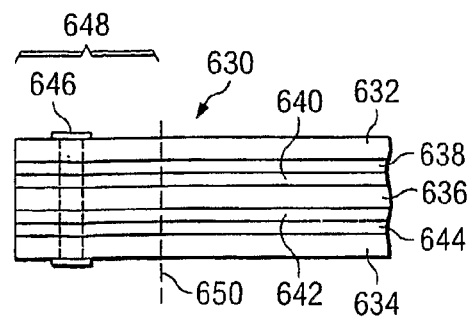
FIG. 17 is an enlarged side view of a second alternative embodiment of a yoke according to the invention.

FIGS. 15 through 17 are side views showing configurations of multi-piece yokes, such as yoke 320. FIG. 15 is a schematic side view showing the preferred construction of a yoke 610, which may be formed as a twist-shank yoke or as a loop yoke. An upper yoke layer 612 and a lower yoke layer 614 are separated from each other by two buffer layers 616, 618, which may comprise cushioning material, such as an elastomer, or materials having other desirable characteristics, such as materials providing lubrication. Buffer layers 616, 618 may be adhered to each other or to the adjacent yoke layer 612, 614, or buffer layers 616, 618 may be free to move relative to each other and to yoke layers 612, 614 during flapping or twisting of yoke 610. FIG. 16 is a side view showing an alternative embodiment, in which yoke 620 has upper and lower yoke layers 622, 624 and a single buffer layer 626. Buffer layer 626 may be adhered to one or both of yoke layers 622, 624 or to neither of layers 622, 624. When buffer layer 626 is adhered to both yoke layers 622, 624, relative movement of layers 622, 624 occurs through shear deformation of buffer layer 626. Buffer layers may be adhered in any appropriate manner, including through the use of co-bonding or co-curing.

An additional embodiment is shown in FIG. 17, in which yoke 630 is formed as a stack of layers, comprising three yoke layers 632, 634, 636 and four buffer layers 638, 640, 642, 644. The layers of yoke 630 are constructed to provide the ability for yoke layers 632, 634, 636 to move relative to each other during flexure of yoke 630. As described above, pairs of buffer layers 638, 640, 642, 644 may be adhered to each other, may be adhered to the adjacent yoke layer 632, 634, 636, or may be free to move relative to yoke layers 632, 634, 636. An optional bolt 646 is shown extending through all layers of yoke 630. It should also be noted that buffer layers 638, 640, 642, 644 may be adhered to one or more yoke layers 632, 634, 636 for only a portion or portions of their length. For example, buffer layers 638, 640, 642, 644 may be adhered only within region 648 extending from the root end (shown at left) to broken line 650. While shown in a particular configuration of the number of yoke and buffer layers, the yoke according to the invention may comprise any number of yoke and buffer layers.

Another alternative embodiment according to the present invention is directed to a stiff-in-plane, four-bladed rotor hub having a compact arrangement with acceptable delta-three angles. The invention addresses the need for improved performance over current three-blade designs by adding a fourth blade in a compact design that is dynamically stable in both helicopter and airplane flight modes. The hub of the invention has a high flapping flexure yoke that is rigidly mounted to the mast, which reduces weight and complexity when compared to gimbaled hub designs requiring a constant-velocity joint to transfer torque from the mast to the hub. Since this is a flexure yoke, the flapping virtual hinge is offset from the mast axis of rotation, which moves the delta-three reference line outboard, and this allows for a low delta-three system with pitch horns located more outboard when compared to a gimbaled hub.

Figure 18:
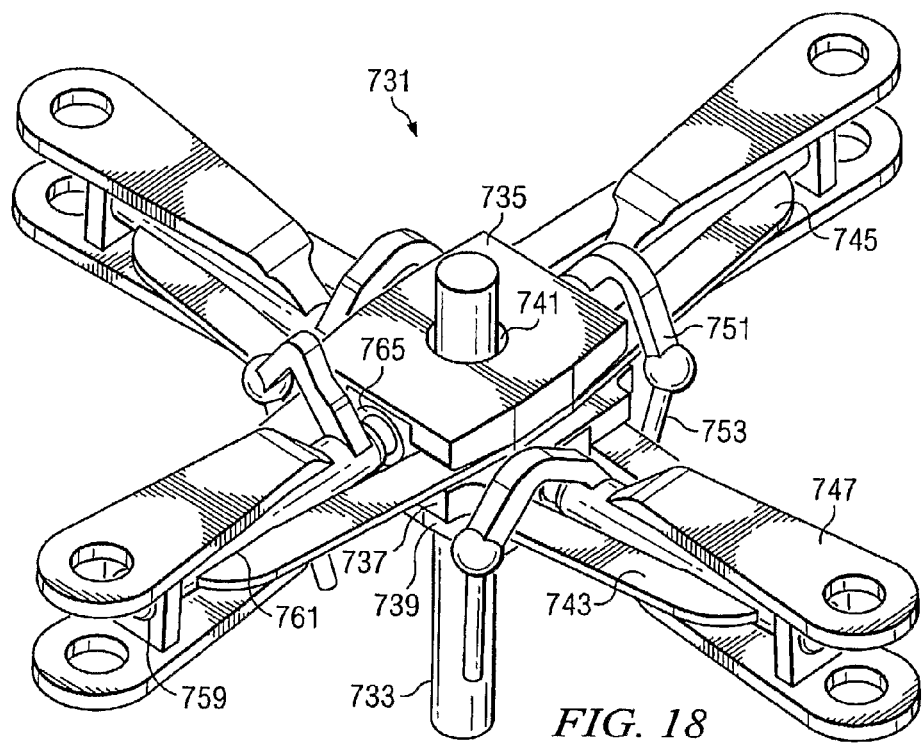
FIG. 18 is a perspective view of an alternative embodiment of a rotor assembly according to the present invention.
Figure 19:
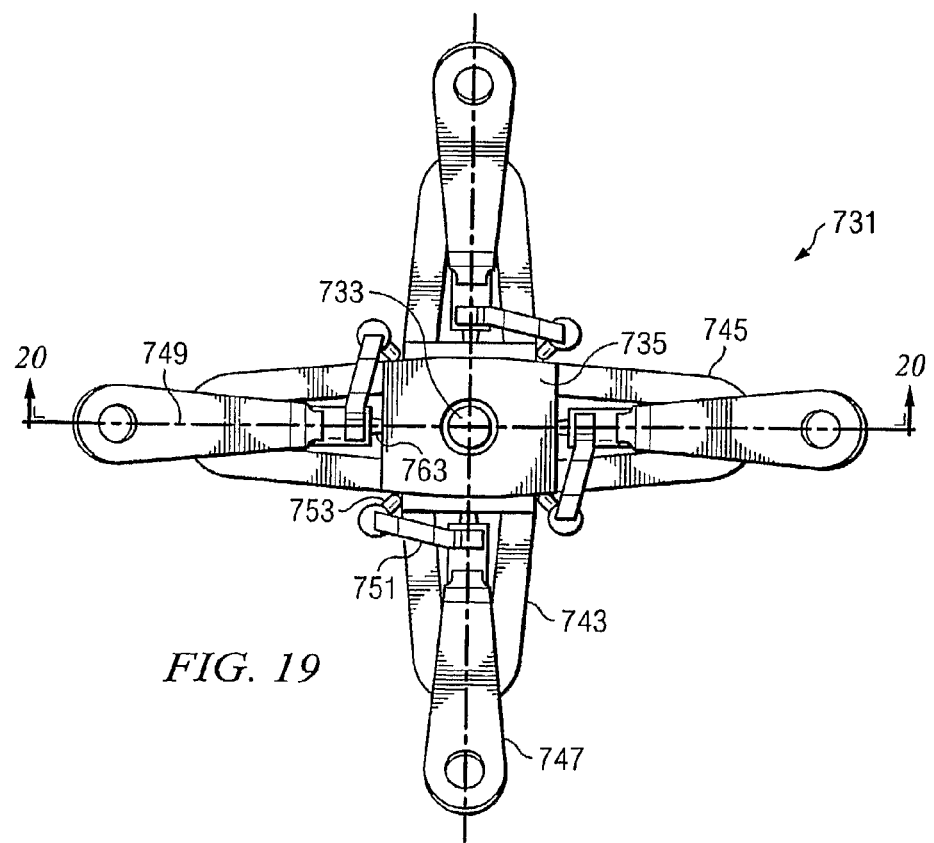
FIG. 19 is a plan view of the rotor assembly of FIG. 18.
Figure 20:
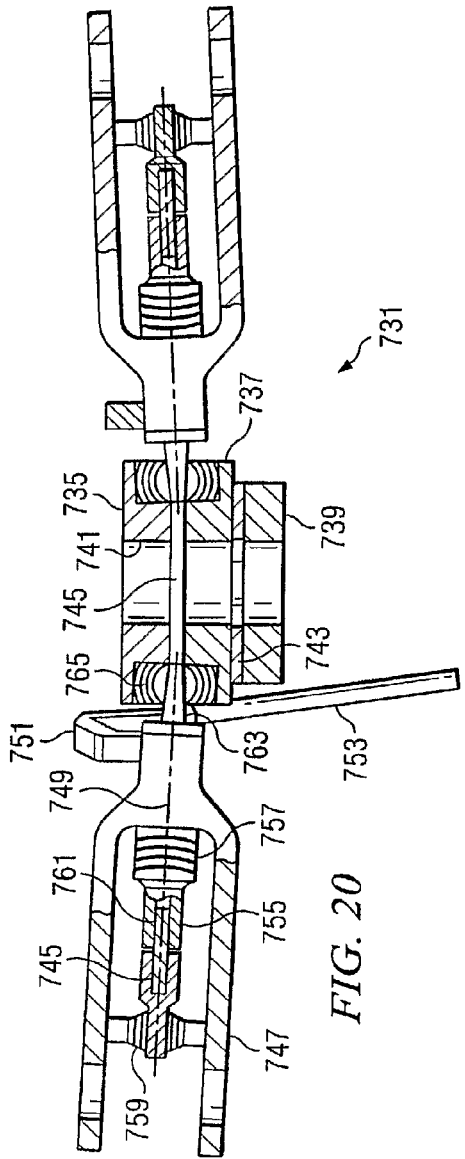
FIG. 20 is a cross-sectional view of the rotor assembly of FIG. 18 taken along line XX-XX of FIG. 19.

Referring to FIGS. 18 through 20, a hub 731 is an assembly rigidly mounted to mast 733 for rotation with mast 733. Hub 731 comprises yoke support plates 735, 737, 739 located in a central position within hub 731, each plate 735, 737, 739 having a transverse bore 741 for receiving mast 733. Two yokes 743, 745 are each carried between a pair of plates 735, 737, 739, with loops extending outward from between plates 735, 737, 739. Yokes 743, 745 lie in generally parallel planes and are rotationally oriented about mast 733 such that yokes 743, 745 extend in generally perpendicular directions relative to each other. Each yoke 743, 745 is used to retain a pair of opposing blade grips 747 to hub 731 against the centrifugal force caused by the mass of blades (not shown) attached to grips 747. Each grip 747 is free to rotate about a corresponding pitch axis 749 for adjusting the pitch of the attached blade, and the pitch is controlled through use of a pitch horn 751 extending from each grip 747 and outside of the associated yoke 743, 745. This positioning of pitch horns 751 ensures a low delta-three angle, which is desired in a tiltrotor hub. A control rod 753 is attached to each pitch horn 751, control rods 753 being moved in response to flight control inputs. In addition, each grip 747 is allowed to flap in direction normal to the plane of each yoke 743, 745 through flexure of the associated loop 743, 745 about a virtual hinge created by plates 735, 737, 739.

FIG. 20 is a cross-sectional view of hub 731 taken through line XX-XX of FIG. 19 and shows the components used to allow rotation and flapping of blade grips 747 relative to plates 735, 737, 739. Though the description is of the components associated with one grip 747, each grip 747 is assembled in hub 731 in the same manner. Grip 747 rotates relative to a spindle 755, spindle 755 engaging an inboard spherical bearing 757 and an outboard radial bearing 759. The outboard end of the loop of yoke 745 passes through a transverse slot 761 in spindle 755. The inboard end of spherical bearing 757 bears against a surface of grip 747 for transferring centrifugal loads from grip 747 into spherical bearing 757, through spherical bearing 757 into spindle 755, and from spindle 755 into yoke 745. Radial bearing 759 locates the axis of the outboard end of spindle 755 on pitch axis 749 and allows for a limited amount of rotation of grip 747 about pitch axis 749 relative to spindle 755 and yoke 745. A pin 763 extends from the inboard end of each grip 747 and engages a spherical bearing 765 located in a pocket formed between plates 735, 737. Bearing 765 locates the axis of pin 763 on pitch axis 749 of grip 747 and allows for a limited amount of rotation of grip 747 about pitch axis 749 relative to plates 735, 737. Bearing 765 also allows for a limited amount of flapping of grip 747 through the flexure of yoke 745.

Referring now to FIGS. 21 through 24, hub 731 is illustrated with grips 747 removed to allow for clear views of the supported, or augmented, flexure design according to the present invention. Each yoke 743, 745 is carried between a pair of plates 735, 737, 739 in a stacked arrangement, with the outboard portions of yoke 743, 745 forming cantilevered beams. Each plate 735, 737, 739 has at least one curved flexure support surface that bears against the associated yoke 743, 745 to support yokes 743, 745 at the flapping hinge, which is offset outboard from mast 733. Without the support provided by plates 735, 737, 739, yokes 743, 745 can only safely endure flapping up to angles of approximately +/−4 degrees. However, the support provided in the design of the present invention allows the outboard loop portions of yokes 743, 745 to flap at much larger angles, for example, to approximately +/−12 degrees.

Figure 22:
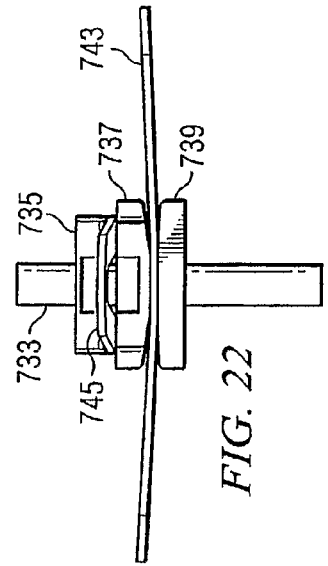
FIG. 22 is a side view of the partial assembly shown in FIG. 21.
Figure 21:
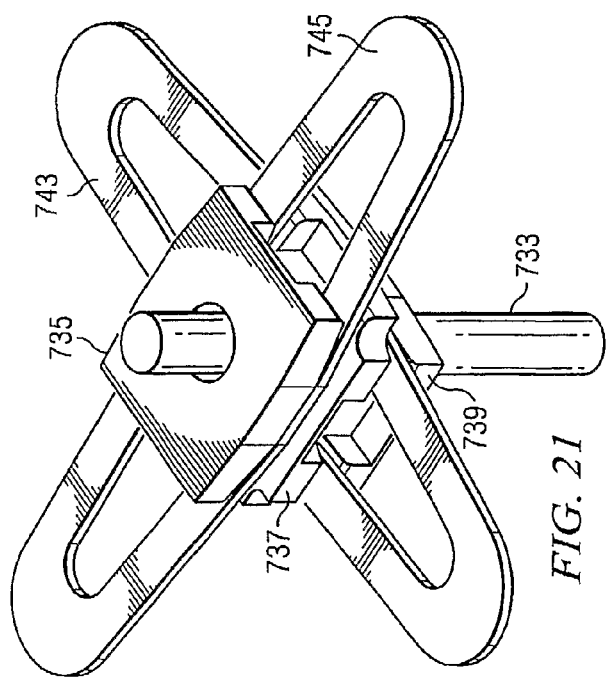
FIG. 21 is a perspective view of the rotor assembly of FIG. 18, the assembly being shown as a partial assembly with the blade grips and associated blade pitch control linkage removed.

FIG. 21 is a perspective view of the assembly of plates 735, 737, 739 and yokes 743, 745, and FIG. 22 is a side view of the same assembly rotated approximately 45 degrees from the view of FIG. 21. FIG. 21 clearly shows that yokes 743, 745 are "pre-coned," such that the outboard loop portions of 743, 745 are canted slightly upward.

Figure 23:
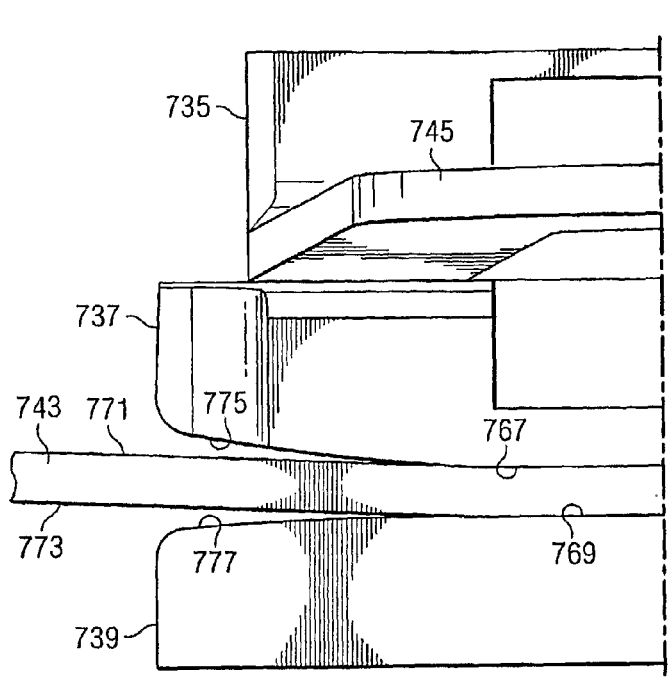
FIG. 23 is an enlarged side view of a portion of the partial assembly shown in FIG. 21.
Figure 24:
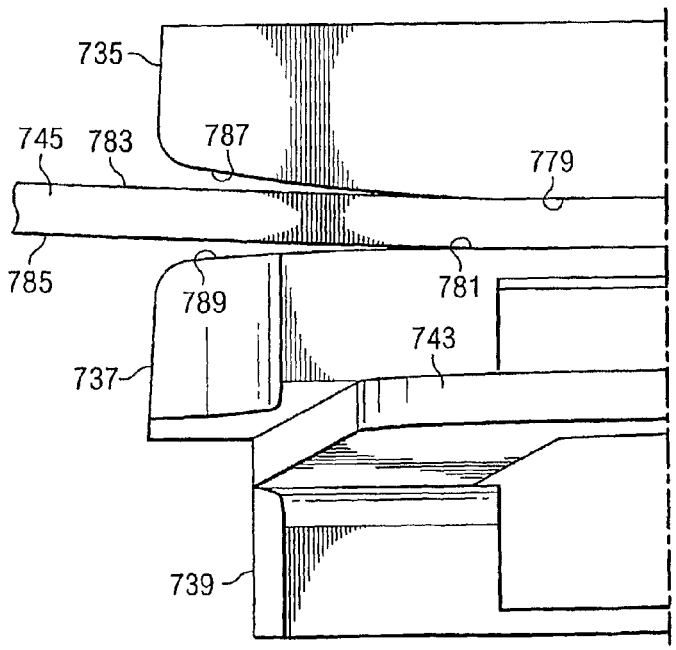
FIG. 24 is an enlarged side view of a portion of the partial assembly shown in FIG. 21, the assembly having been rotated 90 degrees from the view shown in FIG. 23.

FIGS. 23 and 24 are enlarged side views of portions of the assembly of FIGS. 21 and 22, the views showing detail of the flexure support design. Referring now to FIG. 23, yoke 743 is shown mounted between middle plate 737 and lower plate 739. Middle plate 737 has a lower surface 767, and lower plate 739 has an upper surface 769. Loop 743 has an upper surface 771 and a lower surface 773 that are in contact with surfaces 767, 769, respectively. In the embodiment shown, the outboard portion of each surface 767, 769 is formed as an curved flexure support 775, 777, and these allow for the loop portions of yoke 743 to flap in the vertical direction relative to plates 737, 739. For example, when the outboard end of yoke 743 flaps upward, upper surface 771 of yoke 743 bears against flexure support 775 of plate 737, and the curvature of flexure support 775 reduces the bending stress concentrations in any one portion of yoke 743. Likewise, the curvature of flexure support 777 acts to reduce bending stress concentrations in yoke 743 when yoke 743 flaps downward and lower surface 773 bears against flexure support 777. To ensure bending stress concentrations are kept to a minimum, the curvature of flexure supports 775, 777 and the gap between surfaces 771, 773 and supports 775, 777 must be optimized for the particular application.

Referring now to FIG. 24, yoke 745 is shown mounted between upper plate 735 and middle plate 737. Upper plate 735 has a lower surface 779, and middle plate 737 has an upper surface 781. Loop 745 has an upper surface 783 and a lower surface 785 that are in contact with surfaces 779, 781, respectively. In the embodiment shown, the outboard portion of each surface 779, 781 is formed as a curved flexure support 787, 789. As described above for yoke 743, flexure supports 787, 789 allow for the loop portions of yoke 743 to flap in the vertical direction relative to plates 735, 737, and the curvature of flexure supports 787, 789 reduce the bending stress concentrations in any one portion of yoke loop 743 during flexure.

As shown in the figures, yokes 743, 745 are generally planar and are formed to have generally elliptical loops, though yokes 743, 745 may have alternative shapes as required for particular applications. Likewise, yokes 743, 745 are shown as having rectangular cross-sections, though yokes 743, 745 may alternatively be formed to have other cross-sectional shapes. It is preferable that yokes 743, 745 be formed as a laminated structure having layers of fiberglass, or a similar material, and elastomeric materials. Preferably, yokes 743, 745 are formed such that the fibers of the fiberglass are oriented to provide for centrifugal forces to be carried by the fibers in the lengthwise direction.

Figure 25:
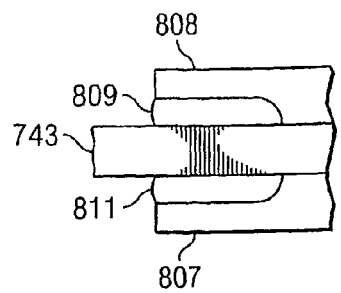
FIG. 25 is an enlarged side view of a portion of an alternative embodiment of flexure support plates according to the present invention.

FIGS. 25 through 28 illustrate alternative embodiments of the supported flexure design of the present invention. FIG. 25 shows yoke loop 743 located between plates 805, 807. Plates 805, 807 have elastomeric flexure supports 809, 811 located at the outboard portion of each plate 805, 807. Supports 809, 811 are compressed as loop 743 flaps and bears against the corresponding support 809, 811. These supports act to support loop 743 in the same manner as the rigid flexure supports described above to reduce bending stress concentrations.

Figure 26:
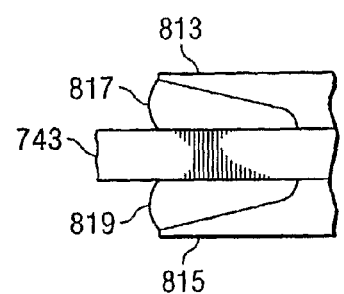
FIG. 26 is an enlarged side view of a portion of a second alternative embodiment of flexure support plates according to the present invention.

FIG. 26 shows a similar arrangement, with loop 743 located between plates 813, 815 and configured for bearing against wedge-shaped flexure supports 817, 819 during flexure of loop 743.

Figure 27:
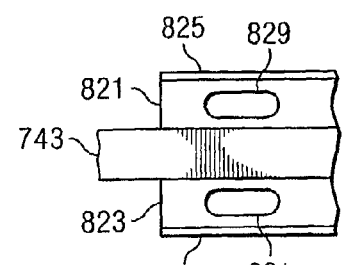
FIG. 27 is an enlarged side view of a portion of a third alternative embodiment of flexure support plates according to the present invention.

In FIG. 27, loop 743 is mounted between deformable, elastomeric plates 821, 823, which are supported by rigid structures 825, 827. Plates 821, 823 are compressed during flexure of yoke loop 743 and support loop 743 to reduce bending stress in loop 743. Elastomeric plates 821, 823 may have optional voids 829, 831 or areas of lesser or greater density formed therein to provide for the desired amount of deformation and spring rate.

Figure 28:
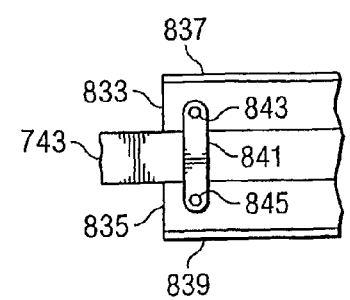
FIG. 28 is an enlarged side view of a portion of a fourth alternative embodiment of flexure support plates according to the present invention.

In the embodiments of FIGS. 25 through 27, the flexure supports are preferably adhered only to the associated plate and not adhered to loop 743. This means that only the spring rate of the compressed flexure support affects the performance during flapping. FIG. 28 shows an embodiment in which loop 743 is mounted between deformable plates 833, 835, which are supported by rigid structures 837, 839. In order to provide for a higher spring rate during flapping, plates 833, 835 are connected to each other by a strap 841 and fasteners 843, 845. In this configuration, the total spring rate is the sum of the spring rates of plates 833, 835 in both directions of flexure.

In each of the embodiments of FIGS. 25 through 28, it should be understood that elastomers having variable spring rates may be used to optimize the deformation and flexure support provided by the elastomers during flapping.

The foregoing embodiments have been provided to illustrate the structural and functional principles of the present invention, and are not intended to be limiting. To the contrary, the present invention is intended to encompass all modifications, alterations, and substitutions within the spirit and scope of the appended claims.

The invention claimed is:

1. An assembly for providing flexure to a blade of a rotary blade system, comprising:
    an upper support plate having an upper curved surface;
    a lower support plate having a lower curved surface; and
    a yoke positioned between said upper support plate and said lower support plate, said yoke having an upper yoke surface and a lower yoke surface, one yoke surface of said upper and lower yoke surfaces having a layer of cushioning material positioned on and secured to said one yoke surface, said layer of cushioning material extending along and following the general contour of said one yoke surface, and said layer of cushioning material directly contacting one of said upper curved surface of said upper support plate and said lower curved surface of said lower support plate;
    wherein said yoke is a multi-piece yoke having at least an upper yoke layer and a lower yoke layer with said upper yoke surface being an upper yoke surface of said upper yoke layer and said lower yoke surface being a lower yoke surface of said lower yoke layer; and
    wherein said upper yoke layer is separated from said lower yoke layer by a buffer layer that is disposed between the yoke layers.

2. An assembly according to claim 1, wherein the buffer layer comprises an elastomeric material.

3. An assembly according to claim 1, wherein said yoke layers are formed from a fiber-reinforced composite material.

4. An assembly according to claim 1, wherein the yoke is a loop yoke.

5. An assembly according to claim 1, wherein the yoke is a twist shank yoke.

6. An assembly according to claim 1, wherein said buffer layer is a first buffer layer, and wherein the assembly further comprises a second buffer layer separating one of the upper and lower yoke layers from the first buffer layer.

7. An assembly according to claim 6, wherein said yoke further comprises a third yoke layer disposed between the upper and lower yoke layers, wherein the first buffer layer separates the upper yoke layer from the third yoke layer, and wherein the second buffer layer separates the lower yoke layer from the third yoke layer.

8. An assembly for providing flexure to a blade of a rotary blade system, comprising:
   an upper support plate having an upper curved surface;
   a lower support plate having a lower curved surface; and
   a yoke positioned between and directly contacting said upper support plate and said lower support plate,
   wherein said yoke is a multi-piece yoke having at least an upper yoke layer and a lower yoke layer with an upper yoke surface of said upper yoke layer contacting said upper support plate and a lower yoke surface of said lower yoke layer contacting said lower support plate; and
   wherein said upper yoke layer is separated from said lower yoke layer by a buffer layer that is disposed between the yoke layers.

9. An assembly according to claim 8, wherein the buffer layer comprises an elastomeric material.

10. An assembly according to claim 8, wherein said yoke layers are formed from a fiber-reinforced composite material.

11. An assembly according to claim 8, wherein at least one of the support plates comprises a deformable elastomeric component that deforms during flexure of the yoke in the direction of the deformable elastomeric component for providing a spring rate.

12. An assembly according to claim 8, wherein at least one of the support plates comprises a deformable elastomeric component that deforms during flexure of the yoke in the direction of the deformable elastomeric component for providing a spring rate; and
   wherein the elastomeric component has a variable spring rate.

13. An assembly according to claim 8, wherein both support plates comprise deformable elastomeric members that deform during flexure of the yoke for providing a spring rate; and
   wherein the elastomeric members are connected together for coordinated movement during flexure of the yoke.

14. An assembly according to claim 8, wherein a first cushioning material is positioned between said upper yoke surface and said upper curved surface of said upper support plate and a second cushioning material is positioned between said lower yoke surface and said lower curved surface.

15. An assembly according to claim 14, wherein said first cushioning material is attached to said upper support plate, and said second cushioning material is attached to said lower support plate.

16. An assembly according to claim 14, wherein each of said first and second cushioning material is rubber.

17. An assembly according to claim 8, wherein a portion of said upper support plate that includes said upper curved surface has the cross-sectional shape of a portion of an ellipse.

18. An assembly according to claim 8, wherein a portion of said lower support plate that includes said lower curved surface has the cross-sectional shape of a portion of an ellipse.

19. An assembly according to claim 8, wherein said yoke is formed of composite material.

20. An assembly according to claim 8, wherein a first protective material is positioned between said upper yoke surface and said upper curved surface of said upper support plate and a second protective material is positioned between said lower yoke surface and said lower curved surface.

21. An assembly according to claim 20, wherein each of said protective layers is formed of a fluorocarbon polymer.

22. An assembly according to claim 8, wherein said yoke has a constant thickness along its length.

23. An assembly according to claim 8, wherein said yoke is a two-piece yoke having a top yoke and a bottom yoke with an upper yoke surface of said top yoke contacting said upper support plate and a lower yoke surface of said bottom yoke contacting said lower support plate.

24. An assembly according to claim 8, further comprising:
   a protective covering enclosing said upper and lower support plates and said yoke.

25. An assembly according to claim 8, wherein said yoke is a twist-shank yoke providing for pitch changes of blades attached to said yoke through twisting of portions of said yoke about a corresponding pitch axis.

26. An assembly according to claim 8, wherein said yoke is formed to have at least two loops, each loop being configured for retaining a blade to said yoke.

27. An assembly according to claim 8, wherein said buffer layer is a first buffer layer, and wherein the assembly further comprises a second buffer layer separating one of the upper and lower yoke layers from the first buffer layer.

28. An assembly according to claim 27, wherein said buffer layer is a first buffer layer, and wherein the assembly further comprises a second buffer layer separating one of the upper and lower yoke layers from the first buffer layer.

29. A rotor hub assembly, comprising:
   an upper plate having a lower curved surface;
   a middle plate having an upper surface and a lower surface;
   a lower plate having an upper curved surface;
   a pair of yokes, one of the yokes being carried between the lower surface of the upper plate and the upper surface of the middle plate, the other of the yokes being carried between the lower surface of the middle plate and the upper surface of the lower plate; and
   deformable flexure supports located on outboard ends of the upper and lower surfaces, such that each yoke bears against an associated flexure support during flexure of the yoke;
   wherein the lower curved surface and the upper curved surface are a non-circular arc that does not form part of a circumference of a circle.

30. An assembly according to claim 29, wherein at least one of the pair of yokes is pre-coned such that an outboard portion of the at least one yoke is canted upward relative to a more inboard portion of the yoke.

31. An assembly according to claim 29, further comprising a blade grip attached to one of the pair of yokes.

32. An assembly according to claim 31, further comprising a spindle connected between the blade grip and the one of the pair of yokes.

33. An assembly according to claim 32, further comprising a spherical bearing disposed between the blade grip and an inboard end of the spindle.

34. An assembly according to claim 32, further comprising a radial bearing disposed between the blade grip and an outboard end of the spindle.

35. An assembly according to claim 31, further comprising a pitch horn extending from the blade grip for moving the blade grip about a pitch axis in response to flight control inputs.

36. An assembly according to claim 31, further comprising a pin extending in an inboard direction from an inboard end of the blade grip.

37. An assembly according to claim 36, further comprising a spherical bearing disposed between two of the upper, middle, and lower plates, wherein the pin at least partially extends through the spherical bearing.

38. An assembly according to claim 29, wherein at least one of the deformable flexure supports is formed as a wedge that has an outboard thickness that is greater than an inboard thickness of the support.

39. An assembly according to claim 29, wherein at least one of the deformable flexure supports has a void formed therein.

40. An assembly according to claim 29, wherein at least one of the deformable flexure supports is attached to another of the deformable flexure supports by a strap.

* * * * *